United States Patent [19]

Gyger, Jr.

[11] Patent Number: 4,855,989

[45] Date of Patent: Aug. 8, 1989

[54] STYLUS

[76] Inventor: Fritz Gyger, Jr., Reckholderweg 4c, CH-3645 Gwatt, Switzerland

[21] Appl. No.: 70,425

[22] Filed: Jul. 7, 1987

[30] Foreign Application Priority Data

Jul. 9, 1986 [CH] Switzerland .............. 2765/86-3

[51] Int. Cl.⁴ .............................................. G11B 3/44
[52] U.S. Cl. ................................................. 369/173
[58] Field of Search ..................................... 369/173

[56] References Cited

U.S. PATENT DOCUMENTS

| | | | |
|---|---|---|---|
| 4,105,213 | 8/1978 | Owaki et al. | 369/173 |
| 4,416,005 | 11/1983 | vanden Hul | 369/173 |
| 4,521,877 | 6/1985 | Shimomoto | 369/173 |

Primary Examiner—Steven L. Stephan
Attorney, Agent, or Firm—Steele, Gould & Fried

[57] ABSTRACT

A stylus for tracking stereophonic and quadrophonic sound grooves in gramophone records is designed to resemble a cutting tool, but is provided with tracking or contact edges in lieu of cutting edges, the tracking edges being of a much longer radius of curvature than comparable cutting edges. A tip (1, 11, 21, 31) of the stylus (2, 12, 22, 32) has at least one substantially flat surface (5, 15, 29, 39) forming a leading front side of the stylus during tracking and has an isosceles triangular, trapezoidal or circular segment-shaped section bounded by tracking edges (6, 7; 16, 17; 26, 27; 36, 37) having a relatively long radius of 3 to 8 μm.

5 Claims, 3 Drawing Sheets

Section 1A-1A

Section 2B-2B

Section 3C-3C

Section 4D-4D

Section 5E-5E

Section 6F-6F

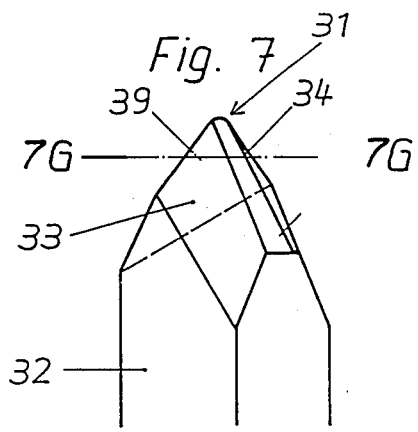
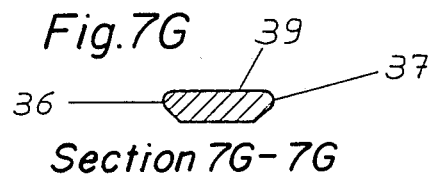
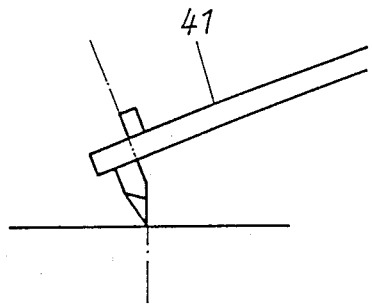
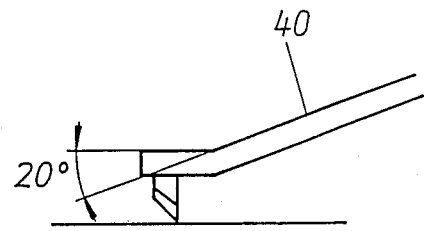

STYLUS

The instant invention relates to a stylus for the tracking of stereophonic and quadrophonic sound grooves of gramophone records.

Sound pick-up styli are known having a substantially conical tip with a rounded apex. Starting out from the basic conical shape, improvements have been achieved by modifying the conical shape into forms having a more or less elliptical cross-section. Finally, additional extra facets have been incorporated in order to meet the need for a variety of special pick-up characteristics.

In all these modifications, attempts have been made through the use of special shapes to remove material in a more or less simple manner to enable the needle to follow the V-shaped surface of the groove as effectively as possible. A purely conical tip contacts the V-shaped surface of the groove over a relatively large radius. A conical tip needle is therefore not capable of very rapidly tracking information from the surface of the groove. Needles having elliptical cross-sections and other known grinding variations are better suited for rapidly tracking information.

Figure 3:
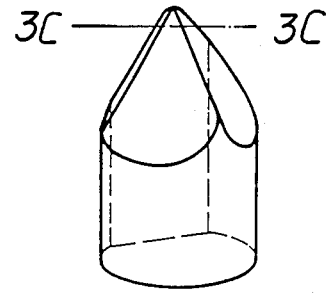
Figure 1A:
Figure 2B:
Figure 3C:

The sound grooves of gramophone records are produced by a cutting process in which a V-shaped cutting tool is guided across a laquered surface. FIG. 3 shows a cutting tool of this type. Information is formed in the surface of the groove by means of movements in lateral mutually vertical directions at 45° to the record surface.

The cutting tool has a shape, the cross-section of which parallel to the surface of the record is substantially triangular in shape. In this respect it differs from the conventional circular or elliptical cross-section of known styli.

The cross sectional shape a cutting tool is unsuitable for styli since such a needle would very rapidly damage the record on account of the sharp contact edges of a needle of this type. In addition, a needle shaped like a cutting tool would touch the "floor" of the sound groove. This would prevent it from following the contours of the lateral surfaces of the sound groove which carry the information. There would also be disturbance due to dust, etc. collecting at the bottom of the groove. Attempts have consequently not been made to give the stylus the same shape as the cutting tool. Instead, improved facet variants have been developed always based on a circular or elliptical cross-section in order to keep the pressure exerted on the surface by the needle low.

Despite all the improvements in grinding, however, pick-up quality of needles with circular or elliptical cross-section has proved to be unsatisfactory for exacting requirements. It is therefore an object of the instant invention to provide a stylus which corresponds as closely as possible to the shape of the cutting tool without, however, damaging the surface of the groove during tracking.

In accordance with the invention this is achieved by a stylus, the tip of which is composed of at least one flat or approximately flat surface which forms the front side of the needle during tracking, and which has an isosceles triangular, trapezoid or circle segment shaped cross-section, whereby the edges which form the front surface have a radius of 3–8 μm.

According to a preferred embodiment the front surface, which in the cross-section corresponds to the base line of the isosceles triangle or trapezoid, or the chord of the segment is also ground at an angle to the longitudinal axis of the needle, preferably at an angle of ca. 20°.

According to another preferred embodiment, all facets lie at the same angle to the axis of the needle.

Various embodiments of the invention will now be described with reference to the accompanying drawings. There is shown in FIG. 1 the tip of a stylus having a circular cross-section (state of the art), FIG. 2 the tip of a stylus having an elliptical cross-section (state of the art), FIG. 3 the tip of a cutting tool having a typical triangular cross-section, FIG. 4 the tip of a simple embodiment of the instant invention, FIG. 5 the tip of an embodiment of the invention for higher quality tracking requirements, FIG. 6 the tip of a further preferred embodiment of the invention for simpler fitting into the needle holder, FIG. 7 the tip of an embodiment of the invention that is improved as compared to FIG. 6, FIG. 8 a system of fitting the needle into the needle holder, FIG. 9 an alternative system of fitting the needles according to FIG. 6 and 7 into the needle holder, FIG. 10 the tip of an embodiment of the invention produced with a single facet, FIG. 11 the mounting of a needle according to FIG. 10 to the needle holder, FIG. 12 the tip of a further embodiment of the invention based on a cylindrical needle.

FIGS. 1A, 2B, 3C, 4D, 5E 6F and 7G are section views through the corresponding numbered lines in FIGS. 1 through 7, respectively.

Figure 1:
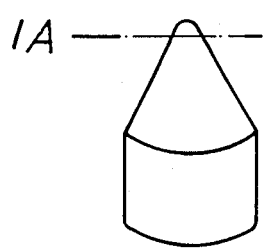
Figure 2:
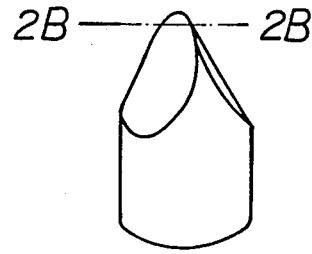

As already mentioned, FIGS. 1 and 2 show needle tips having circular and elliptical cross-sections respectively, such as belong to the state of the art. The cross-section forms are in each case shown in the drawings in side elevation. FIG. 3 shows the tip of a cutting tool and its cross-sectional form. The edges of the cutting tool display typical bevels of 2–3 μm width. With these edges the removal of material is effected with the result that a stylus having such sharp edges would damage the surface of the groove and destroy the record within a short space of time.

Figure 4:
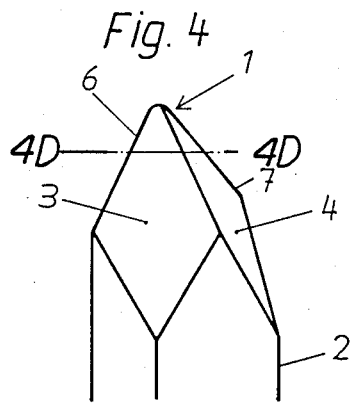

The tip 1 of the stylus 2 of the invention shown in FIG. 4 is formed by flat facets 3,4 and by a remaining side surface 5 of the prismatic needle. The remaining side surface 5 is the reverse surface which is not visible in the above figure. In the cross-section shown underneath, the triangular side corresponding to the side surface 5 is shown.

Facets 3,4 are located symmetrically to the axis of the needle and to the side surface 5. In this way there is formed an isosceles triangle as cross-section. The needle is operated in such a way that the side surface 5 faces the direction of movement of the record groove, i.e. constitutes the front side of the needle. It is, however, also possible to use the needle the other way round in such a way that the surface 5 faces backwards.

The edges 6,7 formed by the surface 5 with the facets 3,4 represent the tracking or contact edges. They are rounded to a radius of 3–8 μm and polished. In this manner the record material can withstand the pressure occurring during tracking without continuous deformation and removal of material.

Edges 6 and 7 together constitute an angle between 45° and 88°, preferably from 70°–85°. The tip of this angle is rounded in such a way that the edge forms a curve which steadily forms an increasing curve from almost a straight line to the greatest curvature, i.e. for example a parabola and so that a clearance of ca. 5 μm remains from the floor of the groove. The parabolic or similar curvature of the edges produces an optimally long tracking line. This also applies to embodiments described below.

Figure 5:
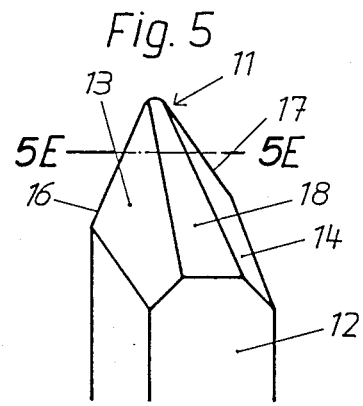

The tip 11 of a prismatic needle 12 shown in FIG. 5 has, as in the case of the embodiment described above, two facets 13,14 symmetrical to a remaining side surface 15. Additional material has also been removed by a facet 18 in order to make the side of the tip pointing in the direction of movement slimmer. This has advantages for the idling movement of the needle in the groove.

As shown by the cross-sectional diagram, the cross-section is trapezoid in this case. Once again the contact edges 16,17 are rounded to a radius of 3-8 μm and polished.

Figure 6:
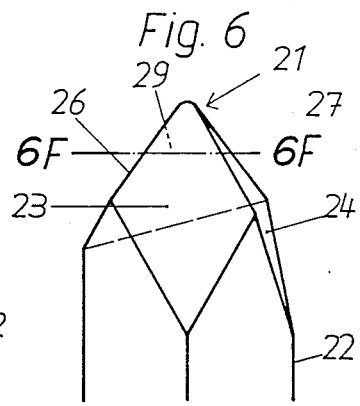
Figure 4D:
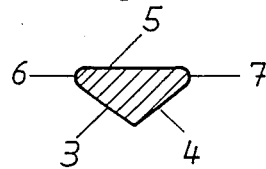
Figure 5E:
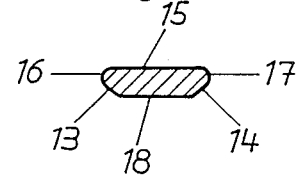
Figure 6F:
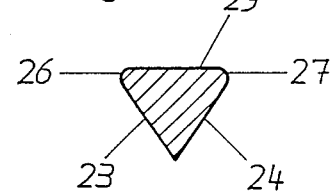

In the case of the tip 21 of another prismatic needle 22 having a square cross-section shown in FIG. 6, two facets 23 and 24 are disposed symmetrically to the axis of the needle and of the direction of movement respectively, corresponding to the facets 3 and 4 of the tip shown in FIG. 4. In addition there is on the front of the needle a facet 29 at an angle of 15°-30° to the lateral surface of the needle.

This embodiment has the advantage that the needle may be mounted perpendicular to the needle holder 41 on the latter, as shown in FIG. 9. The needles shown in FIG. 4 and 5 must be mounted at an angle of ca. 20° to the needle holder 40 as shown in FIG. 8. For this purpose a special bend is necessary in the needle holder 40.

The embodiment of another prismatic needle 32 shown in FIG. 7 has a tip 31 which is formed by four facets 33, 34, 38 and 39. Facet 39 on the front side is inclined at an angle of 15°-30°. This tip 31 again has a trapezoid cross-section and is suitable, due to the facet 39 on the front side, for vertical mounting on the needle holder 44 as shown in FIG. 9. The mounting angle must of course be adapted to the angle below the front side facet surface to the axis of the needle. For efficient manufacture it is of advantage for all facets to be ground at the same angle. For this purpose, the needle may be revolved in a special holding device about its own axis or in one of these different axes of rotation into four successive positions.

Figure 10:
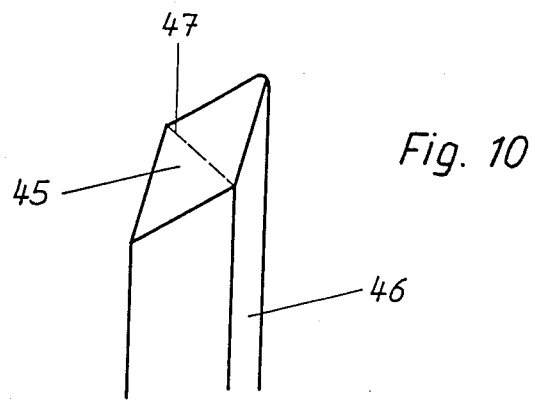

The embodiment of the invention shown in FIG. 10 is characterized in that the tip is manufactured with a single facet surface 45 on a needle 46 of square cross-section. The ground surface 45 is led at a specific angle of inclination of, for example, 45° to the axis of the needle in such a manner that it contains a diagonal 47 of the cross-section surface of the needle. In this way a parallelogram is formed as a cutting surface, the angles of which depend on the selected angle of inclination.

Figure 11:
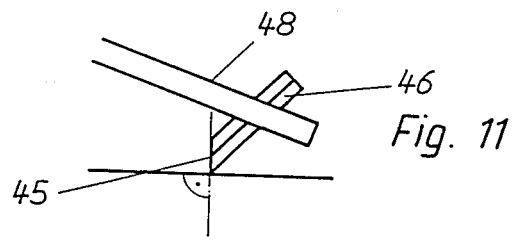

The mounting of this needle to needle holder 48 is shown in FIG. 11. The angle of the front side facet surface to the upper surface of the record should be the customary 90°. The angle of the needle to the needle holder depends on the selected angle of inclination of the facet.

Figure 12:
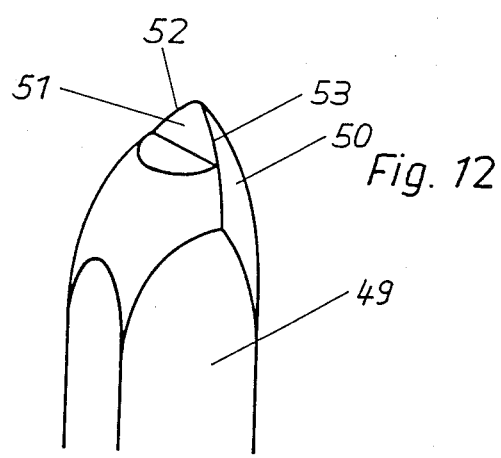

FIG. 12 shows an embodiment of the invention which is based on a needle 49 having an ground cone 50 with circular or elliptical cross-section. A flat or nearly flat surface 51 has been formed by removal of about half of the tip. The tracking edges 52,53 are formed by the cut of the facet surface with the surface of the outside of the cone.

What is claimed is:

1. A stylus for tracking stereophonic and quadrophonic sound grooves of gramophone records, comprising:
a stylus body having a tip, the tip of the stylus having at least one substantially flat surface which forms a front side of the stylus facing forward along said sound grooves during tracking, the stylus being prismatic with a square cross-section and having a surface forming the tip defining a shaped section with tracking edges, the shaped section having facets disposed diagonally to a longitudinal axis of the stylus, the flat surface forming the front side of the stylus leading in the direction of tracking along the grooves.

2. A stylus according to claim 1, wherein the shaped section of the tip has a cross-sectional shape defining an isosceles triangle.

3. A stylus according to claim 1, wherein the shaped section of the tip has a cross-sectional shape defining a trapezoid.

4. A stylus according to claim 1, wherein the shaped section of the tip has a cross-sectional shape defining a circular section.

5. A stylus according to claims 2, 3 or 4, wherein the tip has a facet which corresponds to a base line of said cross-sectional shape, defining said front side of the stylus.

* * * * *